R. V. BARRY.
LAND MARKER.
APPLICATION FILED JULY 28, 1917.
1,263,997.
Patented Apr. 23, 1918.
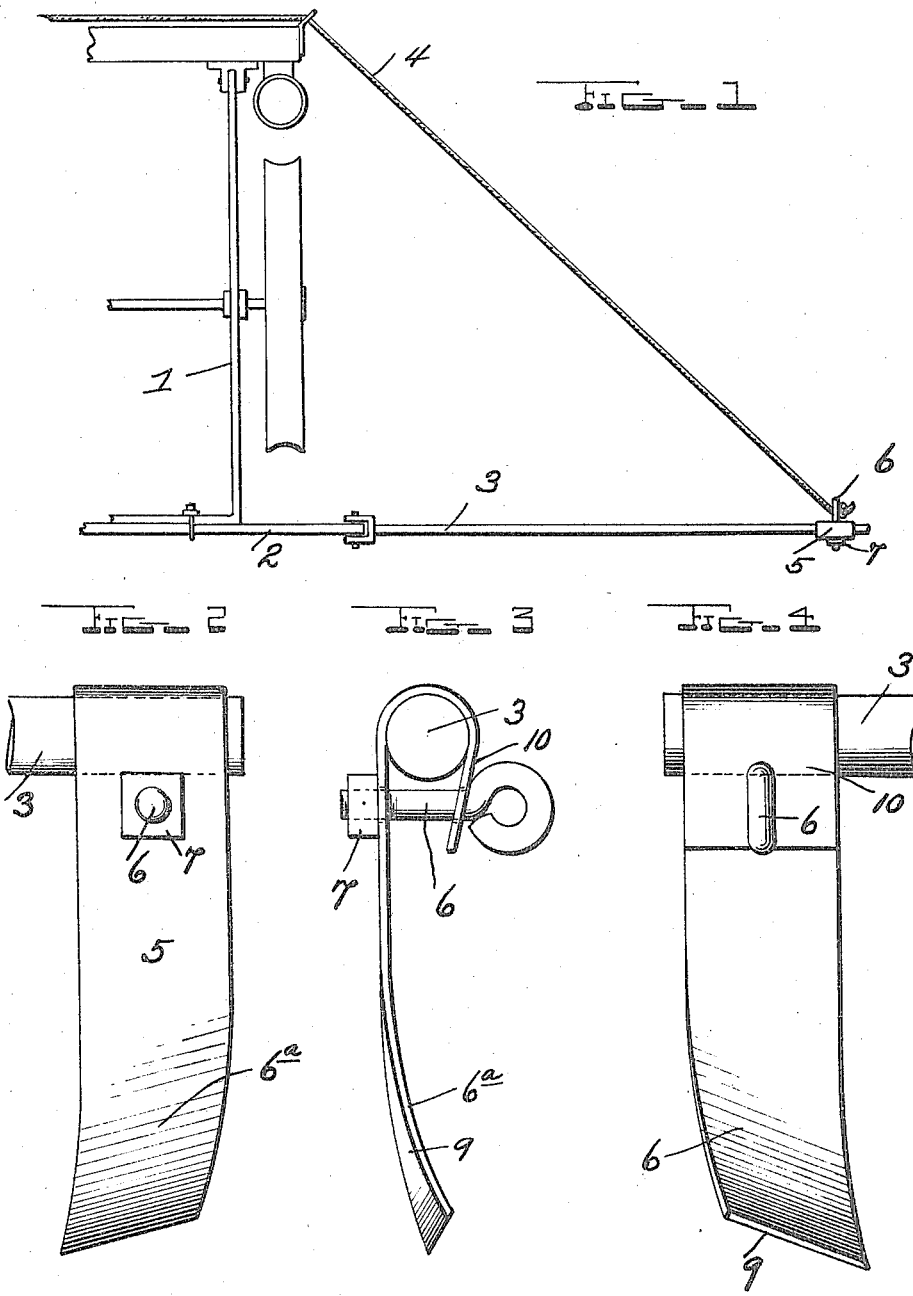

UNITED STATES PATENT OFFICE.

RICHARD V. BARRY, OF DAVENPORT, IOWA, ASSIGNOR TO BARRY AUTOMATIC MARKER CO., OF DAVENPORT, IOWA.

LAND-MARKER.

1,263,997.  Specification of Letters Patent.  Patented Apr. 23, 1918.

Application filed July 28, 1917. Serial No. 183,291.

*To all whom it may concern:*

Be it known that I, RICHARD V. BARRY, a citizen of the United States, residing at Davenport, in the county of Scott and State of Iowa, have invented new and useful Improvements in Land-Markers, of which the following is a specification.

My present invention has to do with land markers such as are ordinarily used on corn planters and the like, and more particularly to marking runners and the swinging arms by which said runners are carried, and the connections of the runners to the arms, all as hereinafter described and definitely claimed.

In the accompanying drawings, which are hereby made a part hereof:

Figure 1 is a top plan view of so much of a corn planter as is necessary to illustrate the application of my improved runner and runner connection to the marker arm of the planter, it being understood that the marker arm is duplicated at the opposite side of the planter, that the two arms are capable of swinging in the ordinary well known manner, and that they are connected through the medium of a cable to enable the one to move the other.

Fig. 2 is an enlarged back view of the runner.

Fig. 3 is an outer edge elevation of the same.

Fig. 4 is a front view of the runner.

Similar numerals of reference designate corresponding parts in all of the views of the drawings.

The planter frame 1, the bar 2 arranged transversely at the back thereof, the arm 3, the cable 4 and the means for guiding the cable may be of the ordinary, well known construction as may also the connection of the arm 3 with the bar 2 or other suitable part of the frame; it being simply necessary that said connection be of such character as to enable the arm to swing upwardly and inwardly and downwardly and outwardly incidental to the traverse of the planter, as hereinafter described.

My novel runner for marking is numbered 5, its clamping bolt 6, and the nut complementary to the bolt 7.

By comparison of Figs. 2, 3 and 4, it will be observed that the runner 5 is curved somewhat after the manner of the moldboard of a plow—*i. e.*, is curved throughout its lower portion lengthwise, as indicated by $6^a$ in Figs. 2, 3 and 4, and is also curved in the direction of its width or twisted, as indicated by 9 in Figs. 3 and 4, the latter provision being calculated to enable the runner to draw and to hold itself in the ground. As will be seen by examination of Fig. 3 the lengthwise curvature of the lower portion of the runner is forwardly from the transverse vertical plane of the upper portion of the runner. Because of this and the flat face of the runner, see Fig. 4, the runner will strongly hold itself in the ground incidental to the turning of the planter at the end of a field, so that the other or opposite marker arm, not shown, drops to the ground and the runner thereon will catch into the ground and by virtue of the flat facing of said runner will strongly engage the ground with the result that the arm 3 illustrated will be pulled upwardly and inwardly alongside of the planter frame.

As best shown in Fig. 3 the upper portion of the runner 5 is looped, as indicated by 10, to straddle the arm 3, which is of circular form in cross-section, and the upper terminal portion of the runner and the major portion thereof are provided with alined apertures for the reception of a headed and threaded bolt, before referred to as numbered 6, which carries the nut 7. Thus the runner can be loosened and tightened in order to set the shoe at any angle from the vertical, and because of this and the lengthwise curvature of the runner, the said runner may be made to make any kind of mark desired, from a very light one to one in which the runner is practically buried in the ground.

It will be noticed that the bolt 6 is disposed adjacent to the arm 3, and that there is considerable space between the terminal portion of the runner and the major portion thereof, and in consequence when the nut is turned up on the bolt the looped portion of the runner will be strongly clamped on the circular arm to hold the runner against casual shifting of position, and yet when it is desired to change the position of the runner the same may be readily accomplished after the nut 7 is loosened.

Notwithstanding the practical advantages ascribed herein to my novel marker arm and runner combined therewith, it will be manifest that the runner is simple and inexpensive in construction, and is adapted to be produced with facility, and is also adapted to last in good working order for an indefinite period.

Having described my invention, what I claim and desire to secure by Letters Patent, is:

The combination of a marker arm having a horizontal portion, of circular form in vertical section, a runner, formed of a single piece of metal, pendent from and parrallel with said arm portion and having a loop straddling said arm portion and formed by the major portion of the runner and a terminal portion which is separated by an intervening space from the major portion, and also having said major portion arranged with its width longitudinal of the arm, and further having the lower part of the major portion curved lengthwise forwardly and curved also in the direction of its width, a headed and threaded bolt extending through alined apertures in the terminal portion and major portion of the runner and disposed below and in spaced relation to the arm, and a nut arranged exteriorly of the runner and mounted on the threaded portion of said bolt.

In testimony whereof I have hereunto set my hand in presence of two subscribing witnesses.

RICHARD V. BARRY.

Witnesses:
WALDO BECKER,
J. F. SCHROEDER.

Copies of this patent may be obtained for five cents each, by addressing the "Commissioner of Patents, Washington, D. C."